United States Patent
Mason

(10) Patent No.: US 10,394,022 B2
(45) Date of Patent: Aug. 27, 2019

(54) DISPLAYS

(71) Applicant: BAE SYSTEMS plc, London (GB)

(72) Inventor: Stephen Paul Mason, Rochester (GB)

(73) Assignee: BAE SYSTEMS plc, London (GB)

(*) Notice: Subject to any disclaimer, the term of this patent is extended or adjusted under 35 U.S.C. 154(b) by 63 days.

(21) Appl. No.: 15/531,260

(22) PCT Filed: Nov. 25, 2015

(86) PCT No.: PCT/GB2015/053588
§ 371 (c)(1),
(2) Date: May 26, 2017

(87) PCT Pub. No.: WO2016/083800
PCT Pub. Date: Jun. 2, 2016

(65) Prior Publication Data
US 2017/0329132 A1 Nov. 16, 2017

(30) Foreign Application Priority Data
Nov. 26, 2014 (GB) .................................. 1421000.9

(51) Int. Cl.
*G02B 27/10* (2006.01)
*G02B 27/01* (2006.01)
(Continued)

(52) U.S. Cl.
CPC ......... *G02B 27/01* (2013.01); *G02B 27/0081* (2013.01); *G02B 27/22* (2013.01);
(Continued)

(58) Field of Classification Search
CPC ............ G02B 27/0172; G02B 27/0081; G02B 6/0016; G02B 2027/0123;
(Continued)

(56) References Cited

U.S. PATENT DOCUMENTS 7,015,944 B2 * 3/2006 Holz ..................... G01S 17/936
348/139
2006/0146012 A1 7/2006 Arneson et al.
(Continued)

FOREIGN PATENT DOCUMENTS

EP 2199843 A1 6/2010
GB 2508662 A 6/2014
WO 2016083800 A1 6/2016

OTHER PUBLICATIONS

International Search Report and Written Opinion received for Patent Application No. PCT/GB2015/053588, dated Feb. 4, 2016. 11 pages.
(Continued)

*Primary Examiner* — Brandi N Thomas
(74) *Attorney, Agent, or Firm* — Finch & Maloney PLLC

(57) ABSTRACT

A display apparatus (1) for use in displaying an image to a viewer, comprising a transparent optical waveguide display unit (2) arranged for receiving image-bearing light (4) into the optical waveguide display unit, for guiding the received light therealong to an output area (24) thereof, and for outputting from the output area the image-bearing light (6) collimated to present a viewable image. A light-emitting display screen (3) arranged adjacent to and behind the output area of the optical waveguide display unit is visible therethrough behind the output area (24). This combines the light from the light-emitting display screen (e.g. imagery) with the viewable image (6).

17 Claims, 3 Drawing Sheets

(51) Int. Cl.
*G02B 27/00* (2006.01)
*G02B 27/22* (2018.01)
(52) U.S. Cl.
CPC .. *G02B 27/2278* (2013.01); *G02B 2027/0125* (2013.01); *G02B 2027/0136* (2013.01); *G02B 2027/0138* (2013.01); *G02B 2027/0174* (2013.01)
(58) Field of Classification Search
CPC ...... G02B 2027/0178; G02B 2027/011; G02B 2027/0118; G02B 2027/0174; G02B 27/4272; G02B 6/0035; G02B 5/1842; G02B 2027/0125; G02B 6/00; G02B 27/283; G02B 27/4205; G02B 2027/0105
USPC .................................................. 359/619–633
See application file for complete search history.

(56) References Cited

U.S. PATENT DOCUMENTS

2012/0154557 A1    6/2012  Perez et al.
2014/0340286 A1*  11/2014  Machida ............ G02B 26/0833
                                                               345/8

OTHER PUBLICATIONS

GB Intellectual Property Office Search Report under Section 17(5) received for GB Patent Application No. 1421000.9 dated Mar. 13, 2015. 3 pages.
International Preliminary Report on Patentability received for Patent Application No. PCT/GB2015/053588, dated Jun. 8, 2017. 9 pages.

* cited by examiner

DISPLAYS

FIELD OF THE INVENTION

The invention relates to displays and methods for displaying an image for viewing by a user. In particular, though not exclusively, the invention is suitable for use in a head-up display system or a helmet-mounted display system, but may also be used in a look-down display system e.g. within a cockpit or cabin of an aircraft, or other craft/vehicle.

BACKGROUND

Externally-mounted imaging systems may be used on vehicles such as tactical military vehicles or vehicles used by emergency services to enhance a driver's viewing capabilities when operating in degraded seeing conditions such as darkness, fog, smoke or dust, or when operating in hazardous viewing conditions in which a driver has a restricted view from a protective vehicle. Examples include using an externally-mounted thermal imaging or image intensifying camera in degraded seeing conditions, or a video camera in hazardous conditions. These systems typically consist of a vehicle-mounted imaging camera for capturing live images and an active matrix liquid crystal display (LCD) to present the resulting images to the driver. For example, the camera may be an uncooled passive thermal imaging camera. FIG. 5 shows an example schematically in which a vehicle 45 has mounted upon its outer surface a camera 42 which produces a live feed of images to an image processor 43 which drives an internally-mounted LCD display screen 44 to display the live images to an occupant 5 (e.g. driver) of the vehicle.

Since the liquid crystal displays used in this set-up obscure the driver's view of the outside world, the driver must then rely entirely on the live camera image feed to control/steer the vehicle.

However, the output of such a LCD display typically presents an image generated at approximately 300 mm to 600 mm from the driver. This can result in kinetosis or motion sickness since relative motion between the driver and the LCD display gives a perception of movement which is not duplicated by the driver's vestibular system.

The invention aims to provide an improvement which may be used to address this situation and provide additional capabilities beyond those of a simple LCD display.

SUMMARY OF THE INVENTION

At its most general, the invention employs a transparent optical waveguide display unit to create a viewable image of collimated image-bearing light and places a light-emitting display screen behind the waveguide display area to generate display light to be viewed through the waveguide display together with the viewable image from the waveguide. The collimated image from the optical waveguide provides a focus at infinity and so the viewed image will not appear to move as the viewer moves relative to the display, while the light-emitting display screen allows additional images or information to be displayed, at a close focus distance, which are fully combined with the image from the transparent waveguide display.

This is important since waveguide displays typically operate with a limited colour gamut and are often essentially monochrome, typically green. They also have a relatively limited field of view. However, the light-emitting display screen (e.g. an LED screen or an OLED screen) may display high-resolution images of both a far superior colour gamut and a larger field of view than would be achievable via a waveguide display (which cannot achieve both in a cost effective manner). Preferably, the viewable image generated by the optical waveguide display may be a view of an external scene, and the light-emitting display screen may be arranged to generate other imagery (e.g. symbology, vehicle control imagery/data for a vehicle) which may or may not comprise an external scene in any part. The optical waveguide display may be connected to (or be arranged to connect to) an image capture device such as a camera (e.g. video camera) for displaying an external view captured by the image capture device. In this way, the external view may be focussed in the far field (collimated) to avoid kinetosis.

The display apparatus may include the image capture device. In another aspect, the invention may provide a vehicle or craft (e.g. aircraft) comprising the display apparatus with the image capture device mounted or attached to the vehicle or craft so as to capture a view or scene (e.g. forward-looking) external to the vehicle or craft.

Transparent optical waveguide display units, such as would be readily known to the skilled person, have previously been used specifically for their transparency which enables a displayed image to be combined with light from an external view. The external light simply passes through the transparent image display/output area of the waveguide display unit and is combined therewith so that the displayed/output image overlays the external view. The present invention allows one to provide the imagery generated by the light-emitting display screen to replace the external view so that the viewable image from the waveguide display combines with imagery from the light-emitting display screen.

This also enables the benefits of a collimated light output to be enjoyed whereby the viewable image output by the waveguide display may be viewed in the far field, whereas the display output from the light-emitting display may be viewed in the near-field—even though the waveguide display is physically closer to the viewer than is the light-emitting display.

A compact single display unit providing combined far field and near field images may then be used in a variety of ways that cannot be replicated by separate displays, for example but not limited to:

Allowing installation within limited volumes.

Providing a collimated image which remains stable with respect to the viewer, despite any relative motion between the viewer and the display unit. This would not be the case with a near field display such as an LCD.

Providing a high resolution display with a large colour gamut which is viewable across a large field of view. With current technology this is cannot be accomplished in a compact far field display in a cost effective manner.

Providing combined far field and near field images within the same field of view, where the near field image appears to be in front of the far field image. Thus the near field image could contain speed, heading, position, etc. type information and the far field image could include video representing an outside world view.

Alternatively the two images could be used together, for example to provide depth cueing.

In addition the displays could be used to provide distinct and separate information, allowing the user to select between the desired content by focussing on the near field or far field image.

In a first aspect, the invention may provide a display apparatus for use in displaying an image to a viewer, comprising a transparent optical waveguide display unit arranged for receiving collimated image-bearing light into the optical waveguide display unit, for guiding the received light therealong to an output area thereof, and for outputting from the output area the image-bearing light to present a viewable image, and a light-emitting display screen for displaying an image and arranged in relation to the output area of the optical waveguide display unit such that an image displayed thereby is visible through the output area, for the combining of display light from the display screen together with said viewable image from the optical waveguide. The optical waveguide display unit may be arranged to receive from an image capture device image-bearing light which bears an image of an external scene, and to display the scene as the viewable image. In this way, an external view or scene outside a vehicle or the like, may be displayed so as to appear in the far field. Symbols, or alpha-numerical information or imagery (e.g. vehicular control symbols or instrument data) may be viewed in the near field via the light-emitting display.

The optical waveguide display unit may be arranged to output substantially collimated image-bearing light from the output area such that the viewable image appears to be focussed behind the light-emitting display screen.

The light-emitting display screen is preferably arranged to output un-collimated display light. The light-emitting display screen may be arranged to generate said display light within the light-emitting display. Examples include an LCD display screen, an OLED display screen, a plasma display screen or the like.

The light-emitting display screen is preferably arranged adjacent to and behind the output area of the optical waveguide.

The optical waveguide display unit is preferably a planar waveguide such that the output area thereof is substantially planar. The light-emitting display screen is preferably substantially planar and oriented substantially parallel to the planar waveguide. The optical waveguide display unit is preferably a plate-like waveguide arranged to guide light therealong by total internal reflection between opposing substantially parallel sides of the optical waveguide.

The light-emitting display screen may be attached (e.g. detachably attached) to the optical waveguide at one or more places along an edge or edges of the planar waveguide to add strength to the apparatus. The attachment may be dimensioned to maintain the spacing between the waveguide and the screen. The attachment may fully surround the edges of the waveguide so as to enclose the space between the waveguide and the screen thereby to prevent ambient light entering the spacing and scattering into the output area of the waveguide. The light-emitting display screen may be fixed to, or relative to, the waveguide display unit. The apparatus is preferably fixed to the vehicle, such as within the drivers cabin (pilots cockpit) as shown. The screen may be stowable to a stowed position in which it is not visible through the output area of the optical waveguide. In some embodiments the light-emitting display screen may be moveable (e.g. pivotable about a pivot attachment, or slidingly or in a pull-down fashion such as to a rolled-out state from a rolled-up state) to and from a stowed position in which it does not cover the rearward-facing surface of the waveguide unit.

The optical waveguide display unit may include an input diffraction grating for receiving image-bearing light and directing the received image-bearing light into the optical waveguide by diffraction, for guiding therealong.

The optical waveguide display unit may include an output diffraction grating for outputting image-bearing light from the optical waveguide. This is preferably at the output area of the display.

The optical waveguide display unit may include an intermediate diffraction grating between the input diffraction grating and the output diffraction grating for receiving image-bearing light from the input diffraction grating and expanding the image-bearing light in a first dimension transverse to the direction of guidance of light towards the output diffraction grating.

The output diffraction grating is preferably arranged for expanding the image-bearing light in a second dimension generally transverse to the first dimension, and to output the result.

The display apparatus may include an image source arranged for providing image-bearing light for input to said optical waveguide.

In a further aspect, the invention may provide a vehicle, aircraft or craft including an image capture apparatus arranged for generating an image(s) of a view external to the vehicle, aircraft or craft, and for generating image-bearing light, and a display apparatus as described above being arranged to receive said image-bearing light for display to an occupant of the vehicle, aircraft of craft.

In a second aspect, the invention may provide a method for displaying an image to a viewer, comprising providing a transparent optical waveguide display unit and receiving image-bearing light into the optical waveguide, guiding the received light therealong to an output area thereof, and outputting from the output area the image-bearing light collimated to present a viewable image, and providing a light-emitting display screen and therewith displaying an image through the output area of the optical waveguide display unit such that an image displayed thereby is visible through the output area, for the combining of display light from the display screen together with said viewable image. The method may include receiving at the optical waveguide display unit image-bearing light from an image capture device (e.g. a camera) which bears an image of an external scene, and displaying the scene as the viewable image.

The display apparatus may form a part of a head-up display (HUD), a helmet-mounted display (HMD) or a head-down display (HDD).

BRIEF DESCRIPTION OF THE DRAWINGS

Non-limiting examples of the invention will now be described, to better illustrate examples of the invention in preferred embodiments with reference to the accompanying drawings, of which.

DETAILED DESCRIPTION

Figure 1:
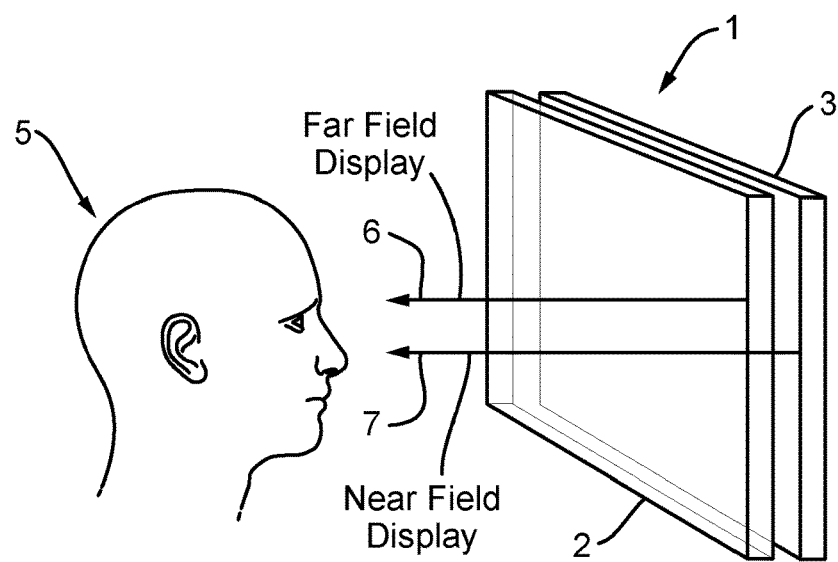
FIG. 1 schematically shows a preferred embodiment of the invention comprising a waveguide display unit positioned for indirect viewing of an output image from an external camera, and a rear light-emitting display screen for viewing a display image or characters.

FIG. 1 shows a schematic view of a display apparatus according to an embodiment of the present invention.

Figure 2:
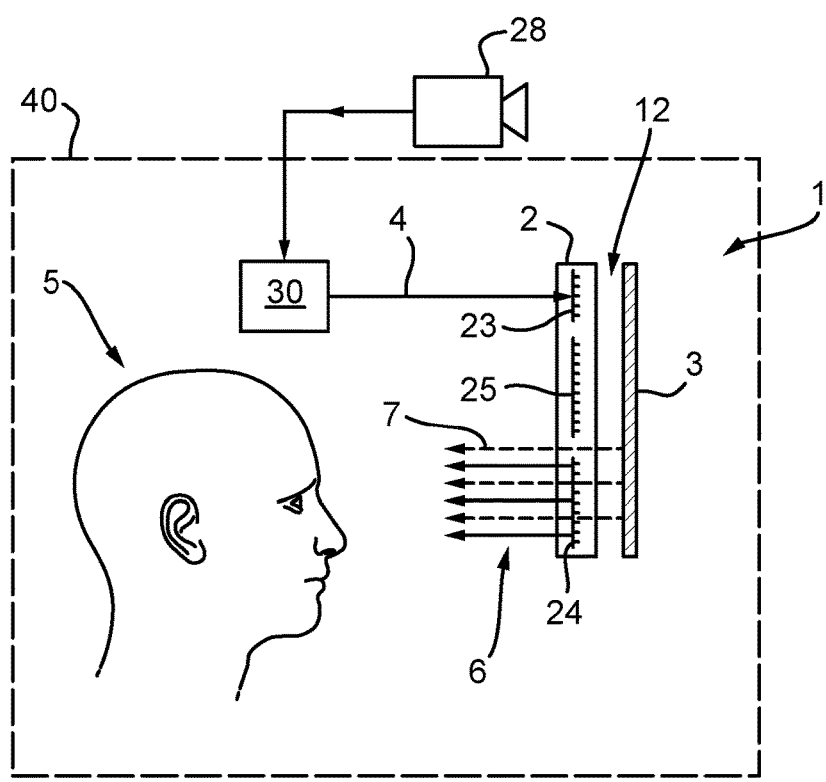
FIG. 2 schematically shows a vehicle including a display apparatus of FIG. 1.

In FIG. 2 the display apparatus 1 is positioned within a cabin 40 of a vehicle (or other craft). A planar slab optical waveguide display unit 2 is positioned between a rear light-emitting display screen 3 and the intended viewing position of a viewer 5 (e.g. pilot or driver). The slab waveguide 2 is described in detail below with reference to FIG. 3.

The rear light-emitting display screen 3 comprises a light-emitting display screen such as an LED, LCD or OLED display screen, which is separated from but parallel to the rearward-facing surface of the waveguide display unit 2, this being the planar surface opposite to that from which the image-bearing light 6 is output from the waveguide display unit, in use. The light-emitting display screen extends over substantially the whole of the rearward-facing surface of the waveguide display unit 2 although in other embodiments it may extend over at least the rearward-facing surface coincident with the position of the output area of the waveguide display unit (albeit on the opposite side of the waveguide from that output area). In this way, the area of the waveguide display unit from which a first output image light is transmitted, and thus the whole area viewed by the viewer 5 in perceiving the image, has positioned behind it the light-emitting display screen. This allows image bearing light conveying a second output image display light generated by light emitting from the display screen, to be viewed through the waveguide display concurrently and together with the first output image light from the waveguide display unit 2. Consequently, a first image from the waveguide display unit may be viewed "embedded" or combined within imagery output by the light-emitting display screen 3.

The rear light-emitting display screen is a flat screen which is parallel to and spaced apart from the planar waveguide display unit (e.g. a spacing about 10 mm or less) by a uniform spacing 12 so as not to be in contact with the planar surface of the waveguide. This is because to be in contact with that surface may interfere detrimentally with the ability of the waveguide to totally internally reflect guided image-bearing light at the internal face of that boundary, within the waveguide.

Internal reflection within the waveguide is strongly influenced by the difference in refractive index of the material of the waveguide (e.g. a glass), and the refractive index of whatever is in contact with the waveguide at the external face of that boundary. By holding the light-emitting display screen separate from that boundary, total internal reflection is not interfered with.

In some embodiments the light-emitting display screen 3 may be attached to the optical waveguide 2 at one or more places along an edge or edges of the planar waveguide to add strength to the apparatus. The attachment may be dimensioned to maintain the spacing between the waveguide 2 and the screen 3. The attachment may fully surround the edges of the waveguide to as to enclose the space between the waveguide and the screen thereby to prevent ambient light entering the spacing and scattering from the screen into the output area of the waveguide. The screen may be fixed to, or relative to, the waveguide display unit. The apparatus is preferably fixed to the vehicle, such as within the drivers cabin 40 (pilots cockpit) as shown in FIG. 2. In some embodiments the light-emitting display screen may be moveable (e.g. pivotable about a pivot attachment) to and from a stowed position (not shown) in which it does not cover the rearward-facing surface of the waveguide unit.

The light-emitting display screen may comprise any suitably flat, light-emitting/generating screen. Examples include LED, OLED, LCD and plasma screens, but this list is not exhaustive.

FIG. 2 schematically shows a vehicle cabin 40 including a display apparatus of FIG. 1. The vehicle (not shown in full) has mounted upon its outer surface an infra-red or image intensifying camera 2B which produces a live feed of images to an internally-mounted image generation unit 30 which generates image-bearing light conveying the images from the camera and inputs the image-bearing light into the waveguide display unit 2 of the display apparatus 1 to display the live images to an occupant 5 (e.g. driver) of the vehicle. An image generation unit may be used such as would be readily apparent and available to the skilled person.

Figure 3:
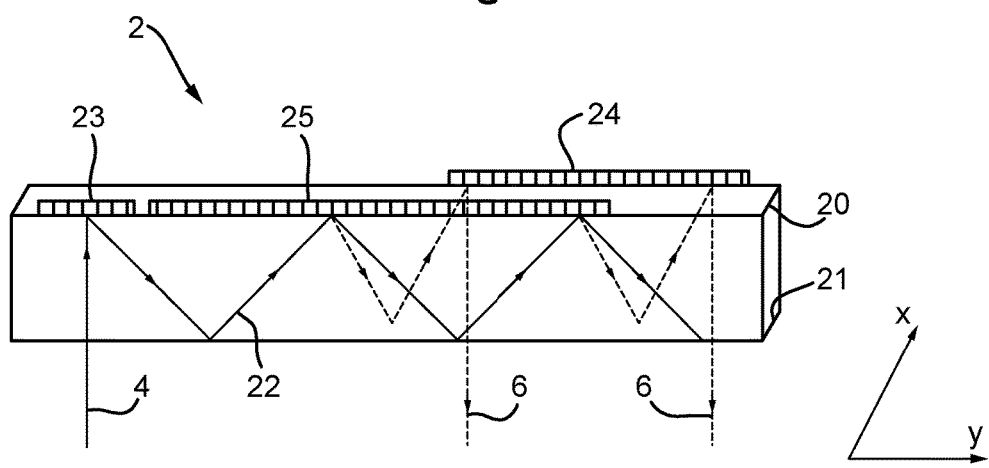
FIG. 3 schematically shows a slab optical waveguide.

The waveguide display unit is arranged such is shown in detail in FIG. 3, which shows a schematic view of the optical waveguide according to an embodiment of the invention.

The planar (e.g. slab) waveguide 2 provides flat opposite surfaces (20, 21) for guiding light rays 22 along the waveguide between the opposing surfaces by total internal reflection (TIR).

An input diffraction grating 23 is positioned upon a surface of the waveguide to receive an input of light 4 and to diffract the received light in a direction forming an angle of incidence to the opposing surfaces (20, 21) of the waveguide internally which permits TIR. Guiding of the diffracted light rays 22 ensues until the guided light is incident upon an output diffraction grating 24. The output grating diffracts received light in a direction forming an angle of incidence to the waveguide surface 20 of the waveguide internally which does not permit TIR, and the light ray 15 is output from the waveguide for viewing. Image-bearing light is collimated and focussed at infinity.

The waveguide includes an intermediate diffraction grating 25 between the input diffraction grating and the output part for receiving image-bearing light from the input diffraction grating and expanding the pupil of image-bearing light in a first dimension generally transverse to the direction of guidance of light towards the output grating. The output diffraction grating is arranged to then expand the pupil of image-bearing light from the intermediate grating in a second dimension generally transverse to the first dimension (e.g. in the direction of guidance of light), and to output the result by diffraction.

In this way, a small input pupil of image-bearing light may be expanded in two generally perpendicular directions to produce an expanded exit pupil of image-bearing light for viewing. An example of a suitable such planar waveguide is described in international patent application number PCT/GB2010/000734, published as WO2010/119240A1 on 21 Oct. 2010, entitled "Optical Waveguide and Display Device". Additionally, the display apparatus includes an image source (not shown) arranged for providing an image-bearing light output, preferably collimated, for input to the optical waveguide. Image sources suitable for this purpose are readily available to the skilled person and will not be described here.

The orientation of the grooves of the intermediate grating are inclined at an angle of e.g. 45° or 60° to the short/width axis (the "x-dimension") of the waveguide.

Image-bearing light incident on the input diffraction grating is diffracted and directed such that the chief ray of the image-bearing light propagates and is incident on the grooves of the intermediate diffraction region at e.g. 45° or 30° to the grooves of the grating.

At each interaction with the intermediate diffraction region, a portion of the image-bearing light is diffracted resulting in an expansion of the input pupil in a first dimension, herein the x-dimension, and the light is turned to propagate through the waveguide towards a low efficiency (2% to 20%) output diffraction grating 24 having grating lines/grooves lying in the x-direction. The diffracted rays of image-bearing light are incident substantially normally on this output grating and, at each interaction with the output grating, a portion of the light is diffracted out of the waveguide, the 'partial' diffraction serving to expand the input pupil in a second dimension, here the long axis (the "y-dimension").

Generally, a diffraction grating or surface can exhibit large amounts of dispersion of incident image bearing light.

This can result in light rays having the same or similar field angles, but which differ in wavelength, being diffracted into different angles into, within or from a waveguide assembly, causing potentially large amounts of chromatic aberration at an output of a display. However, if the dispersion associated with an input grating to a waveguide is substantially matched in an opposing sense with the dispersion associated with an output grating from the waveguide, then the net chromatic dispersion will approach or substantially equal zero.

The correct matching of the diffractive gratings of the waveguide has the effect of mitigating chromatic aberration. In the waveguide assembly of preferred embodiments of the invention, the net chromatic aberration caused by the three diffraction regions shown in FIG. 3 may preferably be zero or substantially zero. For example, the input grating 23 and intermediate grating 25 may be matched with the output grating 24 to provide a net chromatic dispersion of substantially zero.

This result is advantageous for a display application that incorporate such a waveguide assembly as it allows the use of a small, cheap and broadband image generating light source in place of a relatively costly, bulky and high powered monochromatic light source, for example a laser, to illuminate the waveguide assembly. Such a result also allows the display apparatus to correctly present multiple colour or full colour display images or information to a viewer.

It can be shown that the output angle $\theta_o$ of light output by the output grating is related to the input angle $\theta_i$, of light input into the input grating, by the equation:

$$\sin(\theta_o) = \lambda \left( \frac{1}{d_i} - \frac{1}{d_o} \right) + \sin(\theta_i)$$

Where $d_i$ and $d_o$ are the periods of the input and output gratings respectively.

Accordingly, if the periods of the gratings are the same, the term above multiplied by $\lambda$ cancels and $\theta_o$ equals $\theta_i$. Thus the grating periods may be matched to avoid chromatic aberration for light sources other than monochromatic sources such as a laser. It will be appreciated that if it is required to match the gratings in this way to avoid chromatic aberration, light should preferably be output from the waveguide generally perpendicularly.

Figure 4:
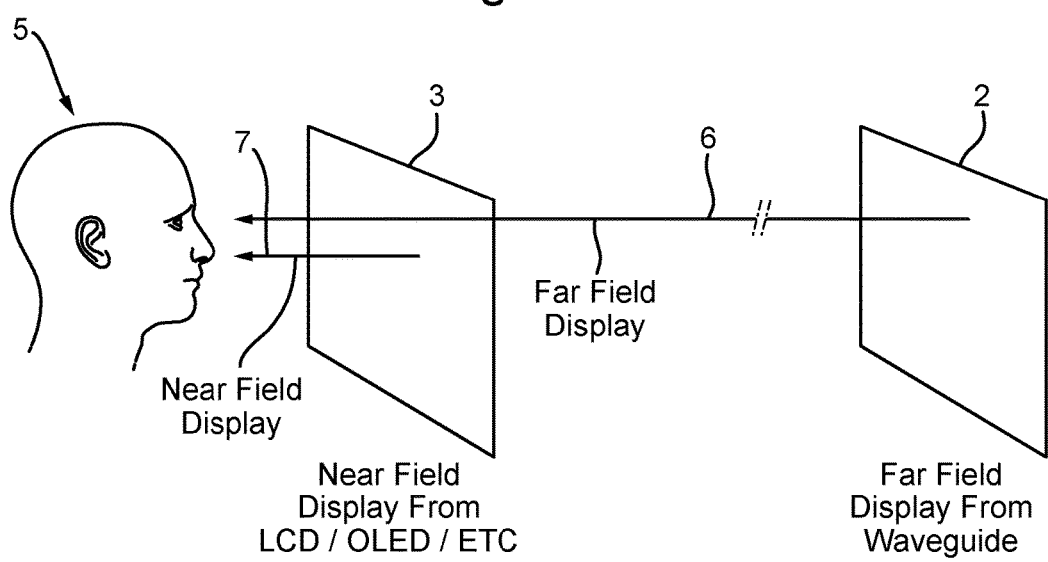
FIG. 4 schematically illustrates the near-field and far-field display appearance of the light-emitting display screen and the optical waveguide display, respectively, of preferred embodiments of the invention.
Figure 5:
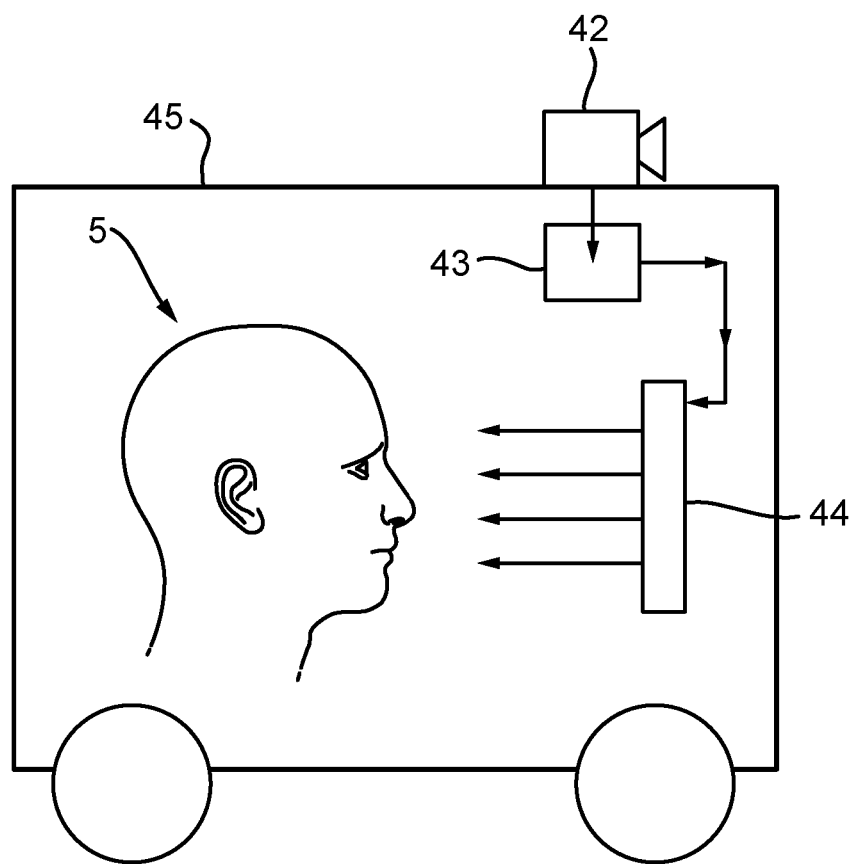
FIG. 5 schematically shows a vehicle including an external camera and an internal light-emitting display screen for viewing an external scene captured by the external camera.

The waveguide 2 is transparent, allowing the user to view the light-emitting display screen 3 (LCD, OLED or similar) through the waveguide. Thus the LCD, OLED or similar, provides the display of colour high resolution images which are presented to the user in the near field over a wide area. The waveguide provides a collimated display which may be monochrome or have a limited colour gamut compared to the LCD, OLED or similar. While physically the waveguide 2 is closer to the user than the LCD, OLED or similar display 3, the visual perception is quite different as shown in FIG. 4. The image displayed by the waveguide 2 is collimated and hence appears to be in the far distance, while the image on the LCD, OLED or similar display screen 3 is in the near field at the distance of the physical display. This allows a variety of uses for the combined display. For example, an external sensor video (FIG. 2; video from item 2B) could be presented on the waveguide while vehicle information could be presented on the LCD, OLED or similar display screen. Three dimensional images may also be displayed, with close objects being presented on the light-emitting display screen, and far-field objects being presented on the slab waveguide. Of course, optionally, for example, instead of presenting images simultaneously on both the waveguide and the light-emitting displays, stand-alone images may be displayed on the waveguide or the light-emitting display screen selectively as and when desired (e.g. by operating either the waveguide display or the light-emitting display alone).

The embodiments described above are for illustrative purposes and modifications, variants and all equivalents thereto, such as would be readily apparent to the skilled person, are encompassed within the scope of the invention, such as is defined by the claims for example.

The invention claimed is:

1. A display apparatus for use in displaying an image, comprising:
   a transparent optical waveguide display unit arranged for receiving collimated image-bearing light into the optical waveguide display unit, for guiding the received light therealong to an output area thereof, and for outputting from the output area the image-bearing light to present a viewable image; and
   a light-emitting display screen for displaying an image and arranged in relation to the output area of the optical waveguide display unit such that the image displayed by the display screen is visible through the output area of the optical waveguide display, for the combining of the image from the display screen together with the viewable image from the optical waveguide display,
   wherein the optical waveguide display unit is arranged to output substantially collimated image-bearing light from the output area such that the viewable image appears to be in a far field and focussed behind the image from the display screen, and
   wherein the light-emitting display screen is arranged to output un-collimated display light in a near field at a distance of the display screen.

2. The display apparatus according to claim 1 in which the optical waveguide display unit is arranged to receive from an image capture device image-bearing light which bears an image of an external scene, and to display the scene as the viewable image.

3. The display apparatus according to claim 1 in which the light-emitting display screen is arranged to generate said display light within the light-emitting display.

4. The display apparatus according to claim 1 in which the optical waveguide display unit comprises a planar waveguide such that the output area thereof is substantially planar, and the screen is substantially planar and oriented substantially parallel to the planar waveguide.

5. The display apparatus according to claim 1 in which the screen is separated from the output area of the optical waveguide display unit by a spacing such that the screen is spaced apart from the output area of the optical waveguide display unit.

6. The display apparatus according to claim 1 in which the screen is stowable to a stowed position in which it is not visible through the output area of the optical waveguide.

7. The display apparatus according to claim 1 in which the optical waveguide is a plate-like waveguide arranged to guide light therealong by total internal reflection between opposing substantially parallel sides of the optical waveguide.

8. The display apparatus according to claim 1 in which the waveguide includes an input diffraction grating for receiving image-bearing light and directing the received image-bearing light into the optical waveguide by diffraction, for guiding therealong.

9. The display apparatus according to claim 1 in which the output area includes an output diffraction grating for outputting image-bearing light from the optical waveguide display unit.

10. The display apparatus according to claim 9 in which the optical waveguide display unit includes an intermediate diffraction grating between the input diffraction grating and the output area for receiving image-bearing light from the input diffraction grating and expanding the image-bearing light in a first dimension transverse to the direction of guidance of light towards the output area.

11. The display apparatus according to claim 10 in which the output diffraction grating is arranged for expanding the image-bearing light in a second dimension generally transverse to the first dimension, and to output the result.

12. The display apparatus according to claim 1 including an image source arranged for providing image-bearing light for input to said optical waveguide.

13. A vehicle, aircraft, or craft including an image capture apparatus arranged for generating an image(s) of a view external to the vehicle, aircraft, or craft, and for generating image-bearing light, and a display apparatus according to claim 1 arranged to receive said image-bearing light for display to an occupant of the vehicle, aircraft, or craft.

14. A method for displaying an image, comprising:
receiving collimated image-bearing light into a transparent optical waveguide unit, guiding the received light therealong to an output area thereof, and outputting from the output area the image-bearing light to present a viewable image; and
displaying, via a light-emitting display screen, an image visible through the output area of the optical waveguide display unit such that the image displayed by the display screen is visible through the output area of the optical waveguide display, for the combining of the image from the display screen together with the viewable image from the optical waveguide display,
wherein the optical waveguide display unit is arranged to output substantially collimated image-bearing light from the output area such that the viewable image appears to be in a far field and focussed behind the image from the display screen, and
wherein the light-emitting display screen is arranged to output un-collimated display light in a near field at a distance of the display screen.

15. The method of claim 14 including receiving at the optical waveguide display unit image-bearing light from an image capture device which bears an image of an external scene, and displaying the scene as the viewable image.

16. A display apparatus including an optical waveguide display and a light-emitting display screen aligned on a common viewing access, whereby a viewable image output by the waveguide display is viewable in a far field, and a display output from the light-emitting display screen is viewable in a near-field, such that both the viewable image and the display screen output are viewable at the same time in an overlaid fashion, wherein the optical waveguide display is arranged to output substantially collimated image-bearing light such that the viewable image appears to be in the far field and focussed behind the light-emitting display, and wherein the light-emitting display is arranged to output un-collimated display light in a near field at a distance of the display screen.

17. The display apparatus according to claim 16 wherein the optical waveguide display comprises a planar waveguide such that the viewable image is presented at an output area of the planar waveguide, and a planar viewing screen of the light-emitting display is oriented along the common viewing access substantially parallel to the planar waveguide.

* * * * *